United States Patent [19]

Walton et al.

[11] Patent Number: 5,029,813
[45] Date of Patent: Jul. 9, 1991

[54] DIAPHRAGM STEM SEAL ATTACHMENT

[75] Inventors: Herbert H. Walton; Randy J. Hall, Marshalltown, Iowa

[73] Assignee: Fisher Controls International, Inc., Clayton, Mo.

[21] Appl. No.: 563,088

[22] Filed: Aug. 6, 1990

[51] Int. Cl.[5] .................................. F16K 31/00
[52] U.S. Cl. .................. 251/335.2; 137/454.6; 92/98 D
[58] Field of Search ............. 137/454.6; 251/335.2, 251/335.3, 214; 277/88, 89; 92/98 D

[56] References Cited

U.S. PATENT DOCUMENTS

| | | | |
|---|---|---|---|
| 229,695 | 7/1880 | Granger . | |
| 255,914 | 4/1882 | Bergen . | |
| 376,129 | 1/1888 | Anderson . | |
| 2,504,057 | 4/1950 | Trefil | 251/31 |
| 2,653,788 | 9/1953 | Svabek, Jr. | 251/335.2 |
| 2,895,708 | 7/1959 | Palumbo | 251/77 |
| 3,223,110 | 12/1965 | Mueller et al. | 137/298 |
| 3,306,570 | 2/1967 | Cooksley | 251/30 |
| 3,319,420 | 5/1967 | Mercier | 92/98 D |
| 3,521,667 | 7/1970 | Johnson | 137/454.6 |
| 3,528,087 | 9/1970 | Perkins | 251/335.3 |
| 3,698,688 | 10/1972 | Kutz | 251/335.2 |
| 3,762,685 | 10/1973 | Curran | 137/454.6 |
| 4,077,605 | 3/1978 | Kutz et al. | 251/335 |
| 4,286,626 | 9/1981 | Leiber | 137/625.65 |

FOREIGN PATENT DOCUMENTS

| | | | |
|---|---|---|---|
| 2228580 | 1/1974 | Fed. Rep. of Germany | 92/98 D |
| 2043831 | 10/1980 | United Kingdom | 92/98 D |

*Primary Examiner*—A. Michael Chambers
*Attorney, Agent, or Firm*—Marshall, O'Toole, Gerstein, Murray & Bicknell

[57] ABSTRACT

A sliding stem valve for controlling fluid flow in a valve body having a seat, a bonnet, a valve stem and plug slidably mounted in the bonnet for engaging the seat during valve shut-off, and a diaphragm forming a stem seal for preventing the undesired leakage of fluid into the atmosphere. The diaphragm is formed of elastomeric material with bead edges at opposite ends. The top diaphragm bead edge is sealed with a retainer to the bonnet. The bottom diaphragm bead seal is sealed to the valve stem while enabling the valve stem to rotate with respect to the bottom diaphragm bead edge. A sized retainer, bushing and retainer ring mount the bottom diaphragm bead edge to the valve stem and permit slidable motion of the bead edge with the valve stem while enabling the valve stem to rotate with respect to the bead edge and still maintain a viable diaphragm seal.

3 Claims, 2 Drawing Sheets

DIAPHRAGM STEM SEAL ATTACHMENT

This invention relates to fluid valves and in particular to a diaphragm seal for a valve stem.

BACKGROUND OF THE INVENTION

Reference may be made to the following U.S. Pat. Nos. of interest: 229,695; 255,914; 376,129; 2,504,057; 2,895,708; 3,223,110; 3,306,570; 4,077,605; 4,286,626.

In many chemical plants specialty process fluids are produced which are intended to be closely regulated by environmental protection desires to prevent release of the process fluids into the atmosphere or into the outside environment. In other instances, the specialty process fluid products may not have an environmental concern but their release into the atmosphere is to be prevented in order to lower the fluid production costs.

Fluid valves are used extensively in chemical plants for controlling the flow of process fluid through pipelines. A particularly troublesome area is the prevention of such specialty process fluids being released into the atmosphere through valve stem packing leakage. The pressure in the pipeline is exerted against the valve stem packing within the valve bonnet and results in the release of small quantities of process fluids containing noxious substances or costly products into the atmosphere.

Sliding stem valves in such a pipeline fluid control application have a requirement that the valve plug and seat be rotatably lapped after assembly to provide the required shut-off. Present sliding stem valves utilize diaphragm devices extending around the valve stem with the valve plug and seat being rotatably lapped by having one end of the diaphragm sealed to the valve stem and the other end of the diaphragm sealed to the bonnet. However, undesired rotation of the valve stem during attempts by an operator to properly seat the valve or to connect the valve stem to an automatic controller, often results in a tearing and destruction of the diaphragm.

Attempts have been made to correct this problem by using anti-rotation devices such as threaded or pinned members which operate satisfactory but this leads to increased valve construction expenses and maintenance, particularly where the anti-rotation devices can be undesirably exposed to the process fluid. Therefore, it is desired to provide a leakproof stem seal for a sliding stem valve which will allow for stem rotation and maintain proper stem sealing with a small number of components.

SUMMARY OF THE INVENTION

In accordance with the principles of the present invention, there is provided a diaphragm seal attached to the valve components in such a manner as to allow for stem rotation and maintain proper diaphragm performance in preventing the release into the atmosphere of undesired process fluid through the valve stem packing. A tubular diaphragm member is placed around the valve stem. A first seal means sealingly attaches one end, such as the top end of the diaphragm, to the valve bonnet. A second seal means attaches the other end, such as the bottom end of the diaphragm, to the valve stem so as to enable the stem to rotate with respect to the bottom seal around the valve stem.

An outer retainer includes an annular recess for sealingly trapping a diaphragm bead edge around the upper perimeter of the diaphragm within the annular recess and sealed against the bonnet. The outer retainer surrounds the valve stem and is mounted in the bonnet so that the valve stem slidably moves with respect to the outer retainer during operation of the valve. An inner retainer is mounted around the valve stem below the outer retainer, and abuts the valve plug at its bottom end. An annular recess at the top of the inner retainer receives the lower end of the diaphragm. The bottom end of the diaphragm includes a bead edge seated within the annular recess of the inner retainer.

A cylindrical bushing is mounted on the valve stem above the inner retainer with a bottom edge in contact with the bead edge at the diaphragm bottom for urging the diaphragm bottom to be maintained within the inner retainer annular recess. A retainer ring fixedly mounted in the valve stem contacts the top edge of the bushing to prevent longitudinal movement of the bushing and the inner retainer during valve stroking.

The inner diameter of the outer retainer is dimensioned with respect to the outer diameter of the inner retainer to form a diaphragm cavity. During upstroking of the valve, the diaphragm flexes between its sealed ends and enters the diaphragm cavity preceding the inner retainer. During valve downstroking, the diaphragm flexes outwardly, maintained by fluid pressure against the valve stem, and is sized so as to permit a convolution into the diaphragm cavity. This diaphragm convolution into the diaphragm cavity is maintained during the valve upstroke so that the diaphragm precedes the inner retainer entry into the diaphragm cavity.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
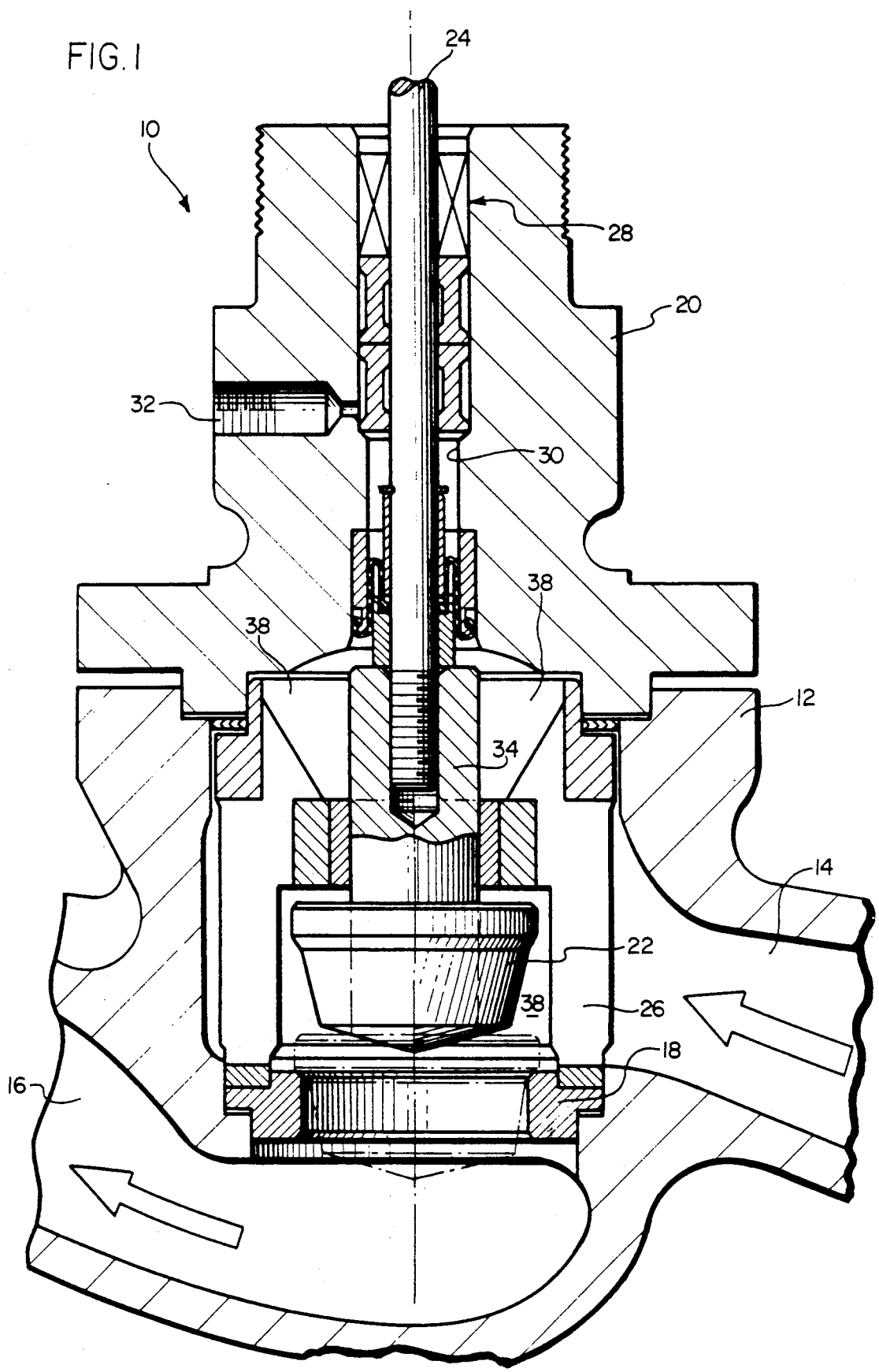
FIG. 1 is a cross-sectional view of a sliding stem valve with a diaphragm seal to provide a leakproof stem seal.

Referring now to the drawings, FIG. 1 illustrates a sliding stem valve 10 having a valve body 12 for connection to a fluid pipeline and receiving an inlet fluid in inlet passageway 14 under pressure for coupling to an outlet passageway 16 through a valve seat 18. A valve bonnet 20 is mounted by suitable means (not shown) into valve body 12 and includes a plug 22 connected to a valve stem 24 for slidable movement with respect to seat 18.

A cylindrical cage 26 formed with open space webs or spokes enables the fluid from passageway 14 to communicate with outlet passageway 16 when plug 22 is in the upstroke position shown in solid lines. In the valve downstroke position, plug 22 is shown in dashed lines seated on valve seat 18 in the valve shut-off position to restrict fluid flow between passageways 14, 16. Valve stem 24 is normally connected to a controller for controlling the position of plug 22 with respect to seat 18 during normal stroking of the valve.

Suitable valve stem packing 28 surrounds stem 24 within valve bore 30 and includes a vent passageway 32 coupling bore 30 with the outside environment. Stem 24 is attached to plug 22 by suitable means, such as the illustrated threadable engagement of one end of stem 24 with a threaded bore within the upper portion 34 of plug 22.

Figure 2:
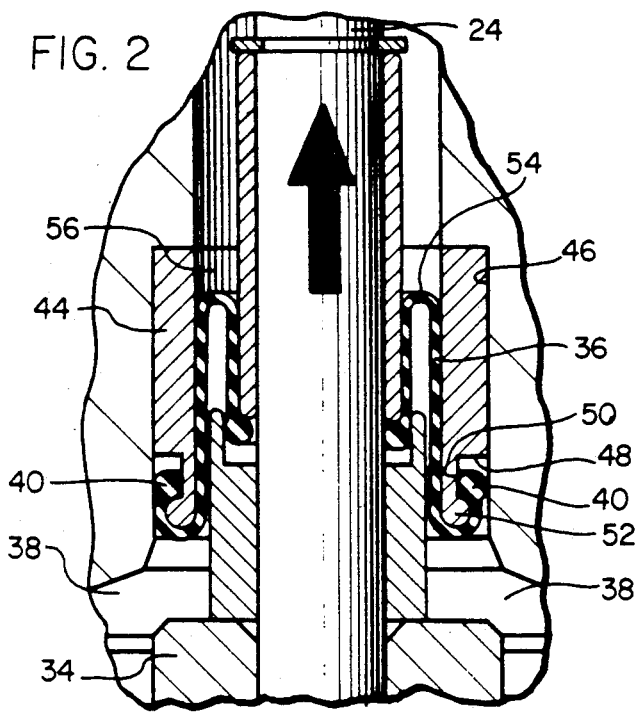
FIG. 2 is a fragmented sectional view illustrating the valve components and their position during the valve upstroke.
Figure 3:
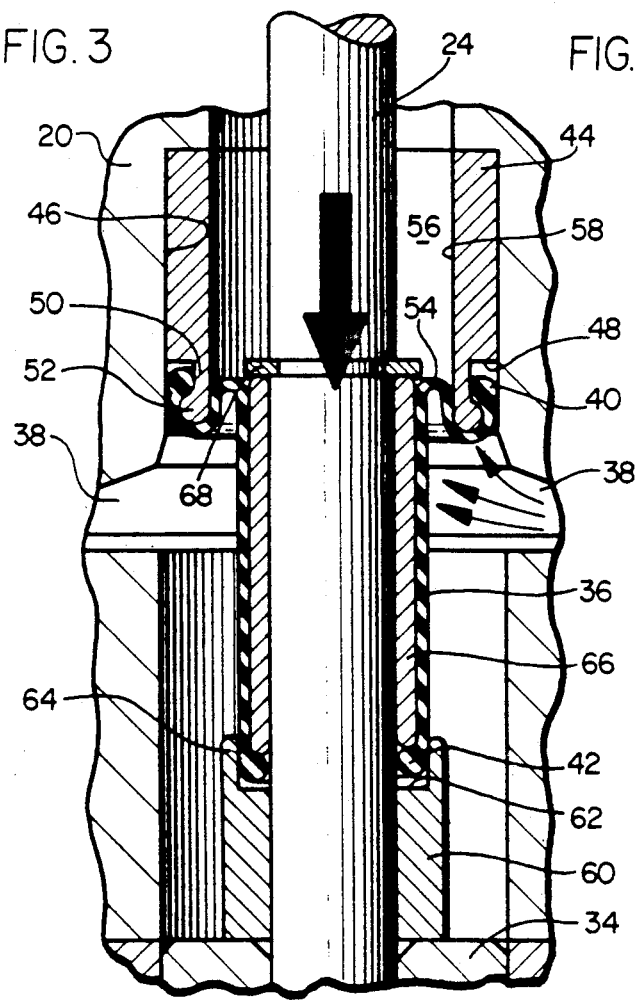
FIG. 3 is a fragmented sectional view showing the valve components position during a valve downstroke.
Figure 4:
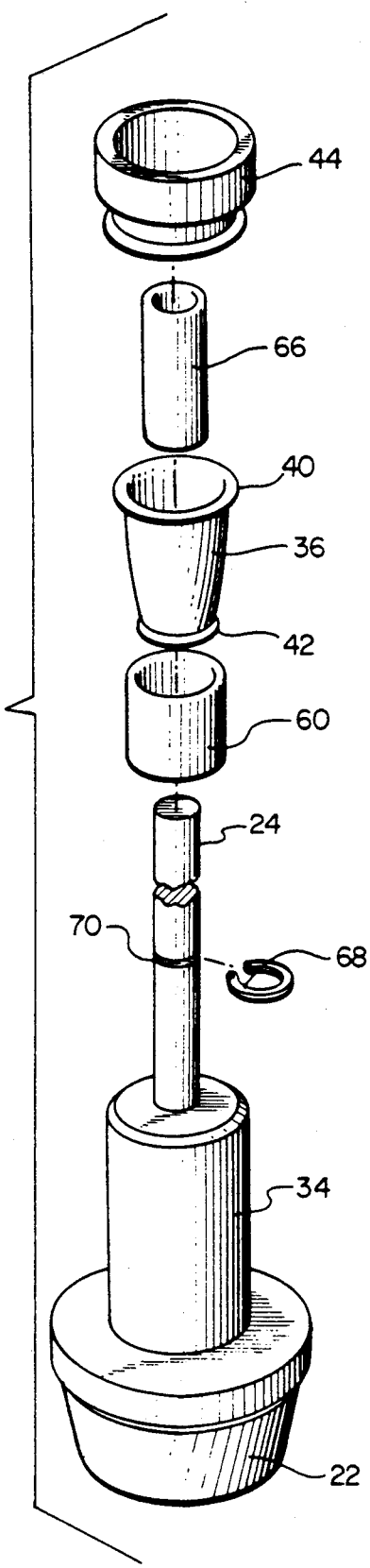
FIG. 4 is an exploded view illustrating the diaphragm seal members in accordance with the principles of this invention.

Referring to FIGS. 2-4, there is illustrated in more detail a diaphragm 36 and means for attaching the diaphragm to the valve components so as to form a seal to prevent fluid in passageway 14 which has passed through cage 26 and entered valve chamber 38 from being released into the atmosphere through valve stem packing 28 or through vent 32 when the valve is in the shut-off position. It is understood of course that valve chamber 38 extends around the valve stem, plug 22, and the upper portion 34 of the valve plug.

Diaphragm 36 is formed of an elastomeric material so that it is flexible and can assume the positions shown in FIGS. 2 and 3 during stroking of the valve. As shown in FIG. 4, diaphragm 36 is frustoconical in shape with respective O-ring type bead edges 40 and 42 at the top and bottom perimeter of the diaphragm. A cylindrical outer retainer 44 is friction fit mounted within a similarly shaped cylindrical bore 46 in bonnet 20. Outer retainer 44 includes an annular recess 48 formed by an upstanding annular shoulder 50 in the inner perimeter of retainer 44. Shoulder 50 ends in an outwardly directed rounded lip 52 which restricts bead edge 40 in the annular recess 48 and between shoulder 50 and bore 46 of bonnet 20.

Shoulder 50, lip 52 and bead edge 40 are dimensioned to permit the bead edge to be easily engaged over lip 52 and rest against shoulder 50 as shown in FIG. 3. When outer retainer 44 is friction fit inserted into bore 46, bead edge 40 sealingly engages bonnet 20 and is fixedly captured within recess 48. This enables fluid pressure in valve chamber 38 to be exerted against diaphragm 36 and to produce an annular convolution 54 in the flexible diaphragm. Diaphragm convolution 54 is formed around lip 52 and extends somewhat into diaphragm cavity 56 formed between retainer inner surface 58 and valve stem 24 as shown in FIG. 3. Convolution 54 is maintained during valve stroking so that the diaphragm extends into cavity 56 during upstroking of the valve as shown in FIG. 2.

The bottom of diaphragm 36 at bead edge 42 is sealed to valve stem 24 in such a manner as to enable the valve stem to rotate with respect to bead edge 42 while maintaining the diaphragm sealed against the valve stem. Referring to FIG. 3, an inner diaphragm retainer 60 is cylindrically shaped with an inner surface slidably engaged on the valve stem until retainer 60 abuts upstanding portion 34 of plug 22. An annular recess 62 is defined by an outer projecting wall 64. Annular recess 62 is sized with respect to the distance between wall 64 and valve stem 24 to permit diaphragm bead edge 42 to be seated within the recess and to be sealed against the valve stem.

Diaphragm bead 42 is maintained in position in recess 62 by means of a cylindrical bushing spacer 66 and a retainer clip 68. Retainer clip 68 is spring mounted within an annular groove 70 in valve stem 24. Cylindrical bushing 66 is dimensioned in size so as to be snugly contained between retainer 68 at one end and diaphragm bead edge 42 at the other end. Valve stem 24 is thus free to rotate inside of and with respect to diaphragm bead 42, retainer 60 and bushing 66 at the lower end of the diaphragm. At the top end of the diaphragm, the fluid pressure in valve chamber 38 and the resulting pressure differential across diaphragm 36 forces diaphragm 36 against outer retainer lip 52 and against bushing 66 to create diaphragm convolution 54 and to maintain the top end of the diaphragm stationary as valve stem 24 is rotated.

Plug 22, stem 24, retainers 44, 60 and bushing 66 may be formed of stainless steel with clip ring 68 being a commonly available metal clip ring. Diaphragm 36 is formed of an elastomeric material suitably chosen with respect to the process fluid being controlled by valve 10.

Thus, in accordance with the present invention, there is provided a reliable pressure seal that allows for rotation of the valve stem free of threads or other anti-rotation devices that cannot be exposed to the valve process fluid. In addition, the illustrated diaphragm seal and attachment means is formed with a minimum of valve components which can be easily maintained and replaced.

The foregoing detailed description has been given for clearness of understanding only, and no unnecessary limitations should be understood therefrom, as modifications will be obvious to those skilled in the art.

We claim:

1. In a sliding stem valve for controlling fluid flow, including a valve body having a seat, a bonnet extending from the valve body, a valve stem with an end plug slidably mounted in the bonnet for engaging the seat during valve shut-off, and an improved stem seal for preventing the undesired leakage of fluid into the atmosphere, the improvement comprising:

a diaphragm seal formed of elastomeric material with respective bead edges at opposite ends and surrounding said valve stem;

first means for sealing one of said diaphragm bead edges at one diaphragm end to said bonnet; and second means for sealing the other of said diaphragm bead edges at the other diaphragm end to said valve stem while enabling said valve stem to rotate with respect to said other diaphragm bead edge, said second means includes, a cylindrical inner diaphragm retainer abutting said end plug and concentrically mounted on said valve stem with a cylindrical inner surface contacting said valve stem, an annular recess at one end of said inner diaphragm retainer facing said bonnet for receiving the other of said diaphragm bead edges at the other diaphragm end, and seal bushing means for engaging the other of said diaphragm bead edges and maintaining the other diaphragm end within said inner diaphragm retainer annular recess and sealed against said valve stem during movement of said valve stem, including a cylindrical bushing concentrically mounted on said valve stem for slidable movement therewith and having one end engaging the other of said diaphragm bead edges; and the outer surface of said cylindrical inner diaphragm retainer is sized with respect to the inner surface of said cylindrical outer diaphragm retainer to enable said inner diaphragm retainer annular recess to slide concentrically within said outer diaphragm retainer and being preceded therewithin by said diaphragm seal flexing between the opposite ends of the diaphragm.

2. In a sliding stem valve for controlling fluid flow, including a valve body having a seat, a bonnet extending from the valve body, a valve stem with an end plug slidably mounted in the bonnet for engaging the seat during valve shut-off, and an improved stem seal for preventing the undesired leakage of fluid into the atmosphere, the improvement comprising:

a frustoconical diaphragm formed of elastomeric material with respective seal edges at opposite ends and surrounding said valve stem with the larger diameter diaphragm end above the smaller diameter diaphragm end;

first means for sealing said diaphragm seal edge at said larger diameter diaphragm end to said bonnet; and second means for sealing the other of said seal edge at said smaller diameter diaphragm end to said valve stem while enabling said valve stem to rotate with respect to said other seal edge, said second means includes, a cylindrical inner diaphragm retainer abutting said end plug and concentrically mounted on said valve stem with a cylindrical inner surface contacting said valve stem, an annular recess at one end of said inner diaphragm retainer facing said bonnet for receiving the other of said diaphragm seal edges at the smaller diameter diaphragm end, and seal bushing means for engaging the other of said diaphragm seal edges and maintaining the smaller diameter diaphragm end within said inner diaphragm retainer annular recess and sealed against said valve stem during movement of said valve stem, including a cylindrical bushing concentrically mounted on said valve stem for slidable movement therewith and having one end engaging the other of said diaphragm seal edges; and the outer surface of said cylindrical inner diaphragm retainer is sized with respect to the inner surface of said cylindrical outer diaphragm retainer to enable said inner diaphragm retainer annular recess to slide concentrically within said outer diaphragm retainer and being preceded therewithin by said diaphragm seal flexing between the opposite ends of the diaphragm.

3. In a sliding stem valve for controlling fluid flow, including a valve body having a seat, a bonnet extending from the valve body, a valve stem with an end plug slidably mounted in the bonnet for engaging the seat during valve shut-off, and an improved stem seal for preventing the undesired leakage of fluid into the atmosphere, the improvement comprising:

a diaphragm seal formed of elastomeric material with respective bead edges at opposite ends and surrounding said valve stem;

first means for sealing one of said diaphragm bead edges at one diaphragm end to said bonnet; and second means for sealing the other of said diaphragm bead edges at the other diaphragm end to said valve stem while enabling said valve stem to rotate with respect to said other diaphragm bead edge, said second means includes, a cylindrical inner diaphragm retainer abutting said end plug and concentrically mounted on said valve stem with a cylindrical inner surface contacting said valve stem, an annular recess at one end of said inner diaphragm retainer facing said bonnet for receiving the other of said diaphragm bead edges at the other diaphragm end, and seal bushing means for engaging the other of said diaphragm bead edges and maintaining the other diaphragm end within said inner diaphragm retainer annular recess and sealed against said valve stem during movement of said valve stem, including a cylindrical bushing concentrically mounted on said valve stem for slidable movement therewith and having one end engaging the other of said diaphragm bead edges, and position retaining means for maintaining the longitudinal position of said cylindrical bushing on said valve stem during slidable movement of the valve stem; and said position retaining means includes an annular groove in said valve stem and a retainer ring mounted in said annular groove abutting the other end of said cylindrical bushing.

* * * * *